United States Patent [19]

White

[11] Patent Number: 5,006,749

[45] Date of Patent: Apr. 9, 1991

[54] METHOD AND APPARATUS FOR USING ULTRASONIC ENERGY FOR MOVING MICROMINIATURE ELEMENTS

[75] Inventor: Richard M. White, Berkeley, Calif.

[73] Assignee: Regents of the University of California, Oakland, Calif.

[21] Appl. No.: 416,532

[22] Filed: Oct. 3, 1989

[51] Int. Cl.$^5$ ............................................. H01L 41/08
[52] U.S. Cl. ................................... 310/323; 310/328; 310/366; 310/313 R
[58] Field of Search ............... 310/323, 328, 316, 317, 310/313 R; 318/116, 118

[56] References Cited

U.S. PATENT DOCUMENTS

| | | | |
|---|---|---|---|
| 4,562,373 | 12/1985 | Tokusima et al. | 310/323 X |
| 4,562,374 | 12/1985 | Sashida | 310/328 |
| 4,692,649 | 9/1987 | Izukawa et al. | 310/323 X |
| 4,692,652 | 9/1987 | Seki et al. | 310/323 |
| 4,692,672 | 9/1987 | Okuno | 310/323 X |
| 4,857,793 | 8/1989 | Okuno | 310/328 X |

FOREIGN PATENT DOCUMENTS

| | | | |
|---|---|---|---|
| 0022478 | 2/1985 | Japan | 310/323 |
| 0091873 | 5/1985 | Japan | 310/323 |
| 0091874 | 5/1985 | Japan | 310/323 |
| 0091875 | 5/1985 | Japan | 310/323 |
| 0091876 | 5/1985 | Japan | 310/323 |
| 0091879 | 5/1985 | Japan | 310/323 |
| 0170285 | 7/1986 | Japan | 310/323 |
| 0180582 | 8/1986 | Japan | 310/323 |
| 0203873 | 9/1986 | Japan | 310/323 |
| 0224879 | 10/1986 | Japan | 310/323 |
| 0141978 | 6/1987 | Japan | 310/323 |
| 0259484 | 11/1987 | Japan | 310/323 |

Primary Examiner—Mark O. Budd
Attorney, Agent, or Firm—Owen, Wickersham & Erickson

[57] ABSTRACT

A micromotor device for moving a micro-miniature element along a predetermined path comprises a membrane supported on a substrate having an upper planar surface for supporting the element to be moved and a lower surface. An ultrasonic transducer attached to one membrane surface is supplied with electrical power to produce ultrasonic energy and thereby cause a flexural wave action in the membrane. The membrane may be comprised of a layer of piezoelectric material in one embodiment or an electrically insulating amorphous material which utilizes an electrostriction phenomenon in another embodiment. The generated flexural wave action produces linear movement of one or more microelements on a membrane for a variety of applications. Control of the moving elements may be maintained using a linear position sensor which includes a circuit for producing feedback control signals.

34 Claims, 8 Drawing Sheets

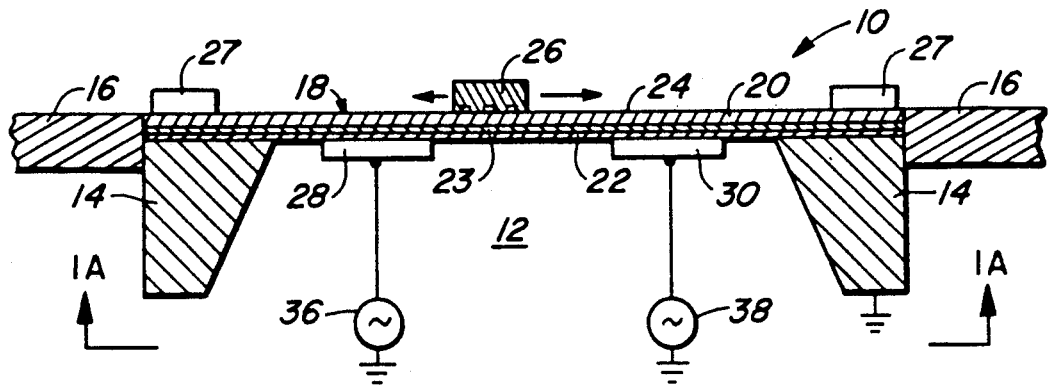
FIG._1.
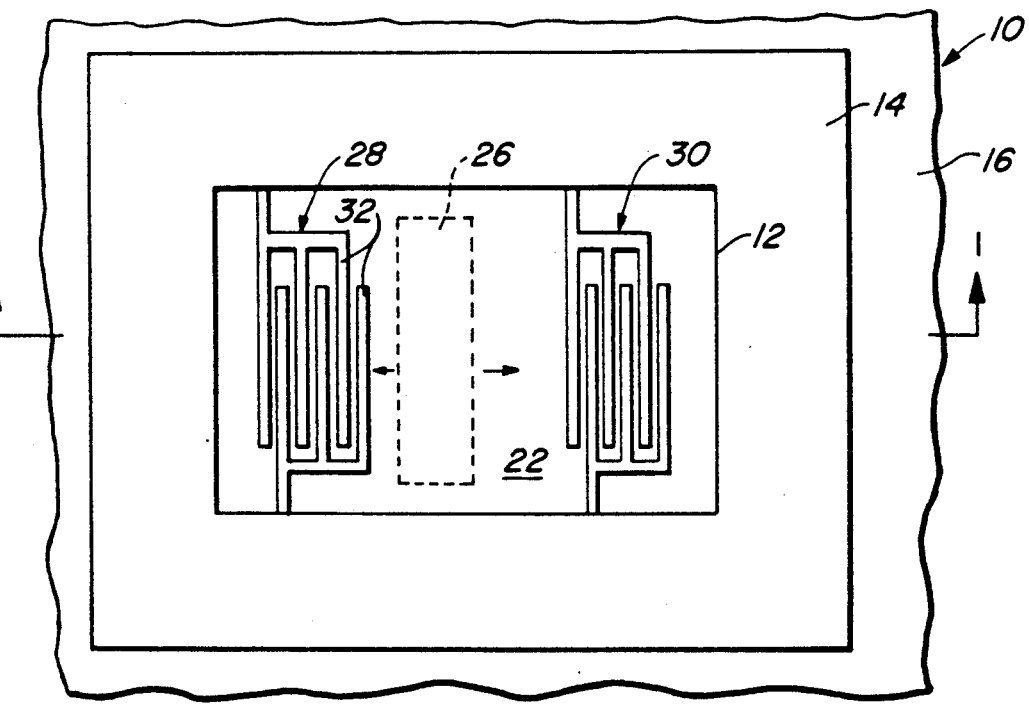
FIG._1A.
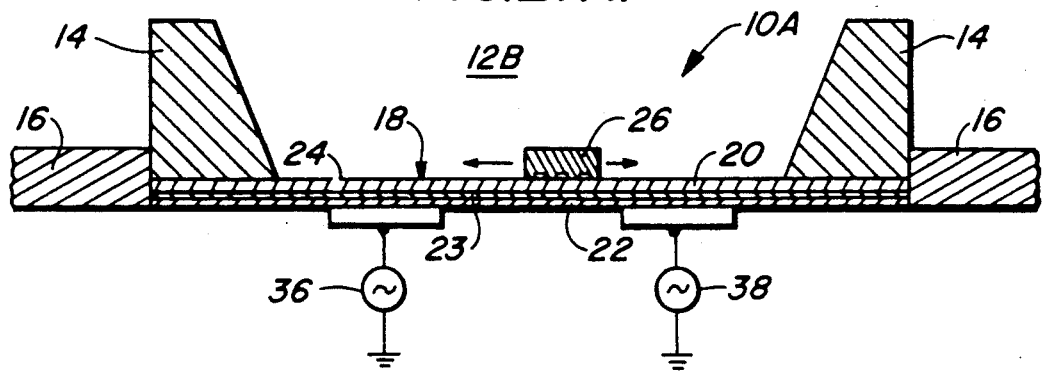
FIG._1B.

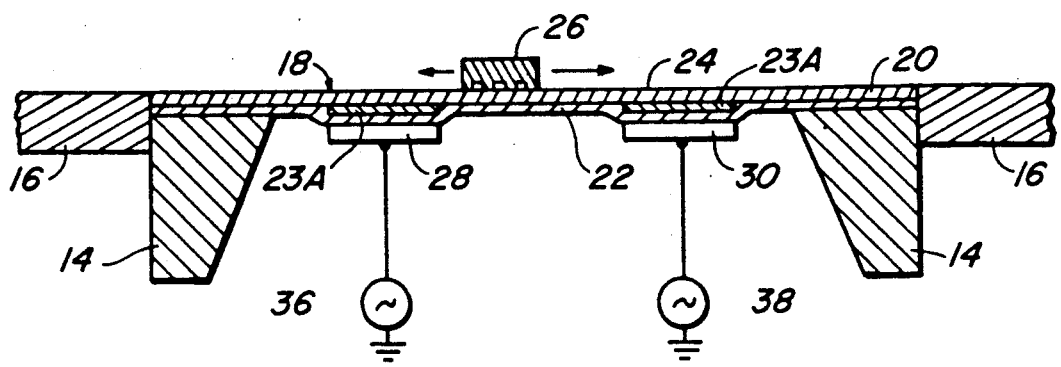
FIG._2A.
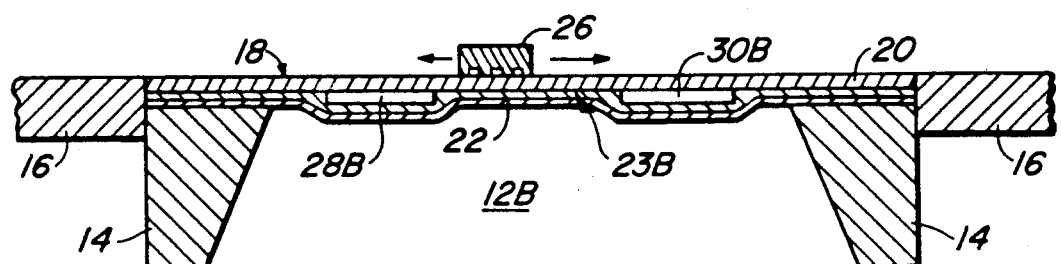
FIG._2B.
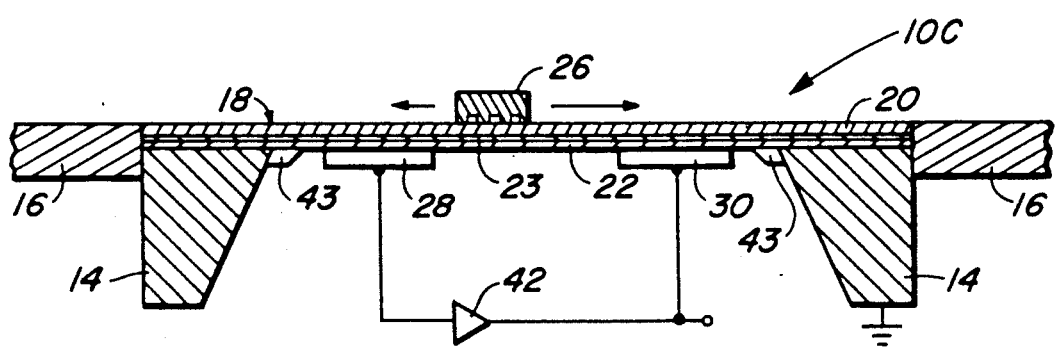
FIG._3.
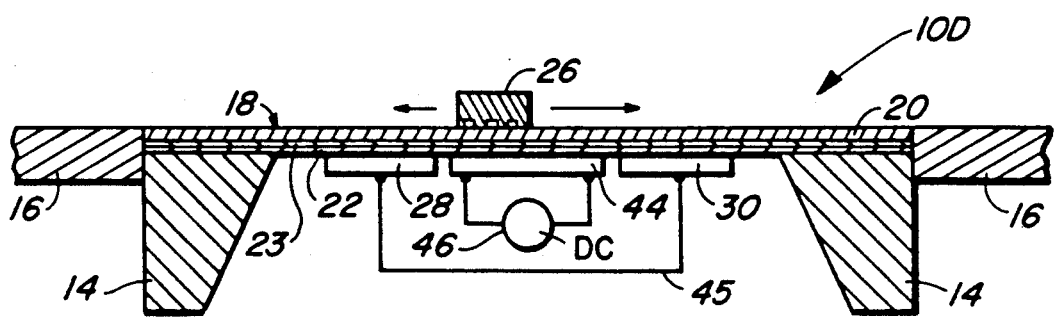
FIG._4.

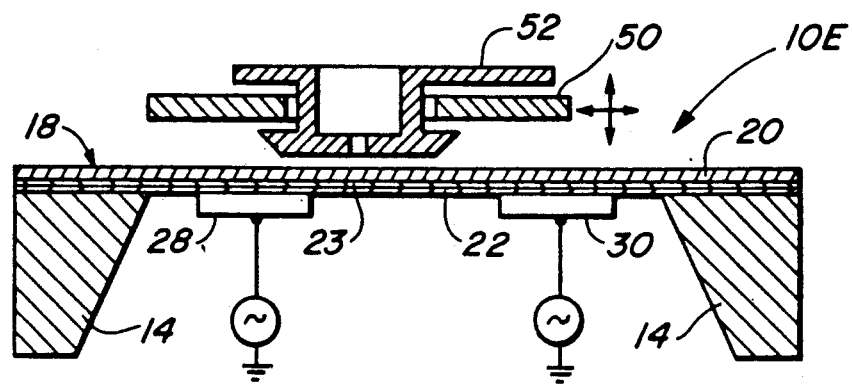
FIG._5.
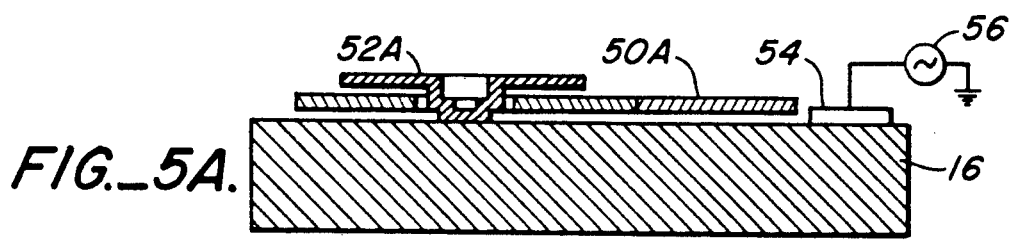
FIG._5A.
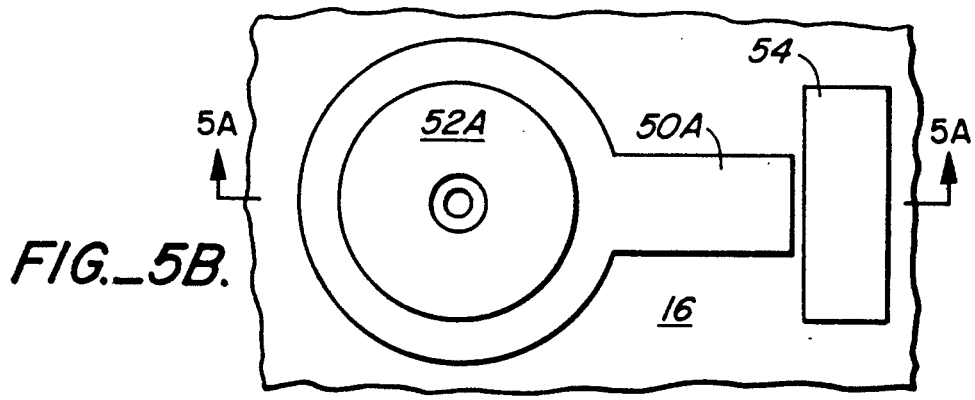
FIG._5B.
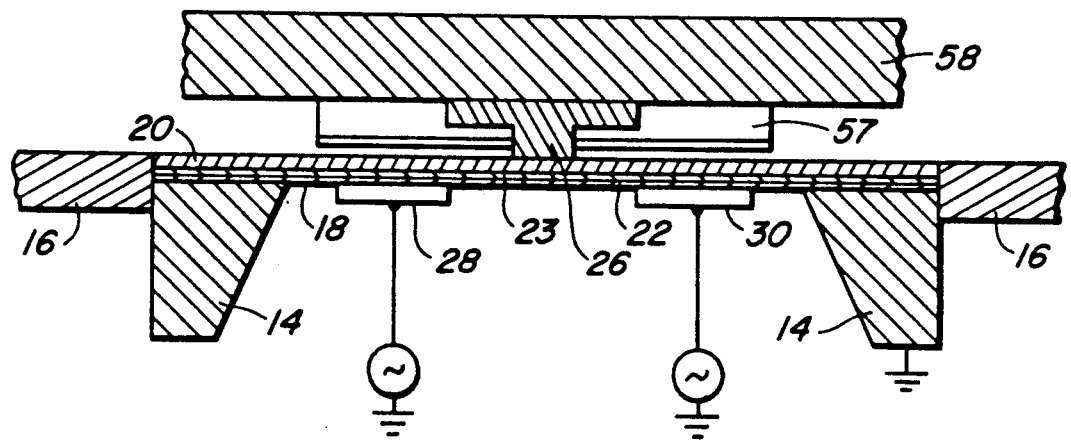
FIG._6.

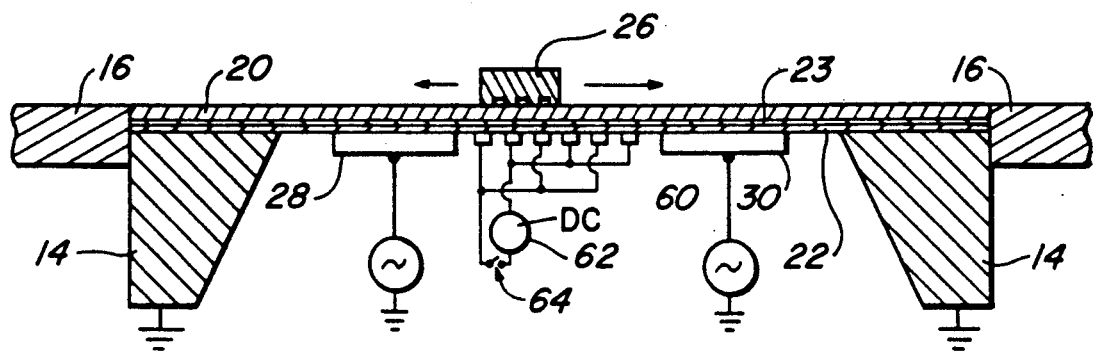
FIG._7.
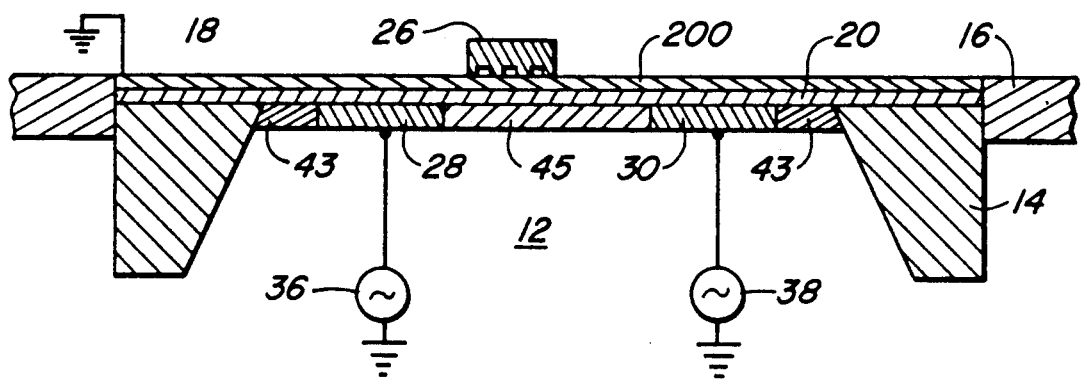
FIG._12.
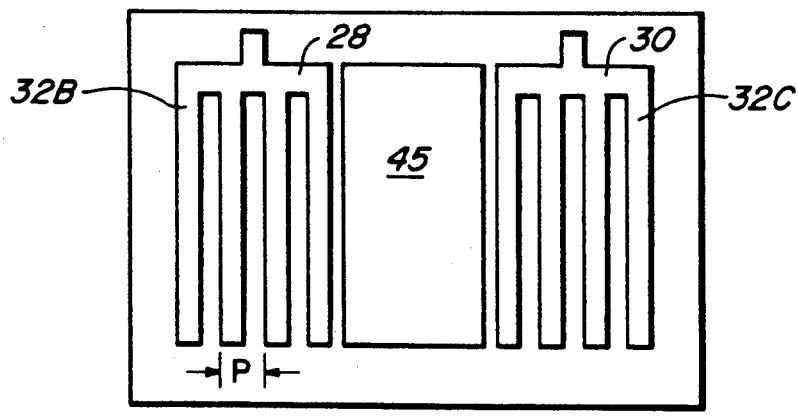
FIG._13.

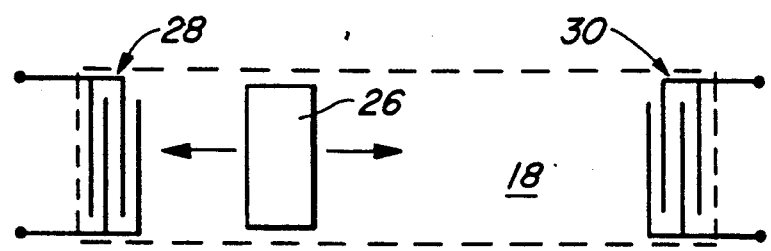
FIG._8A.
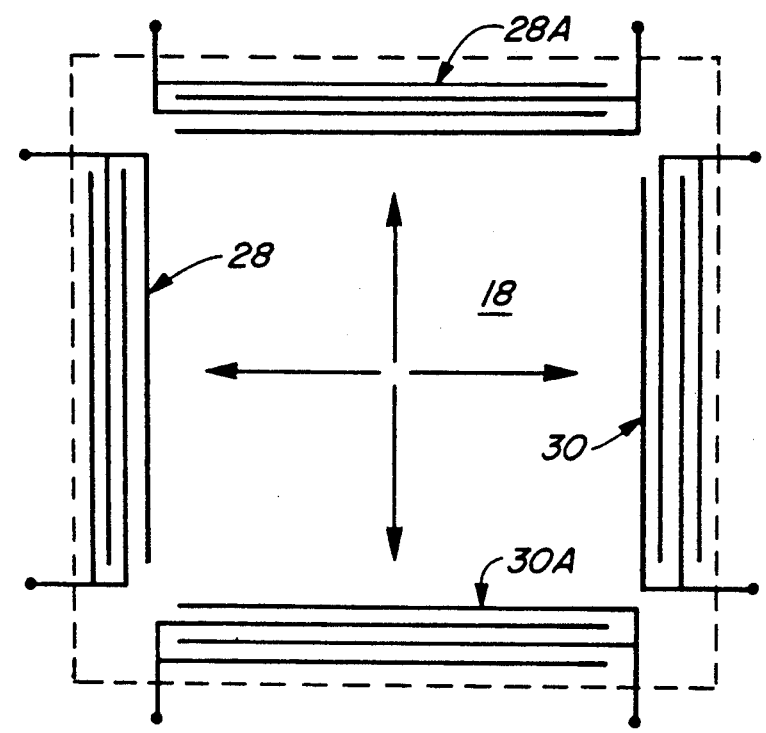
FIG._8B.
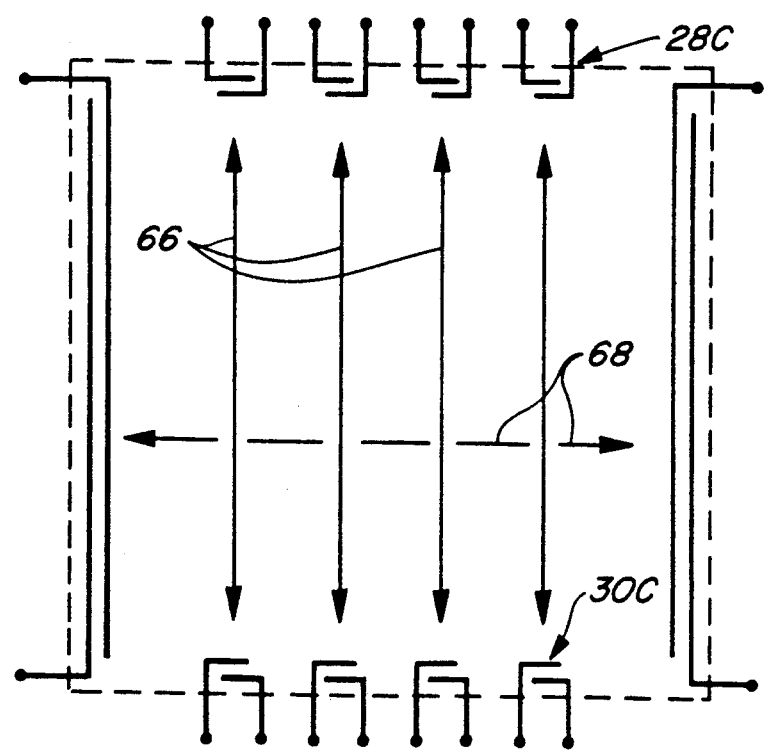
FIG._8C.

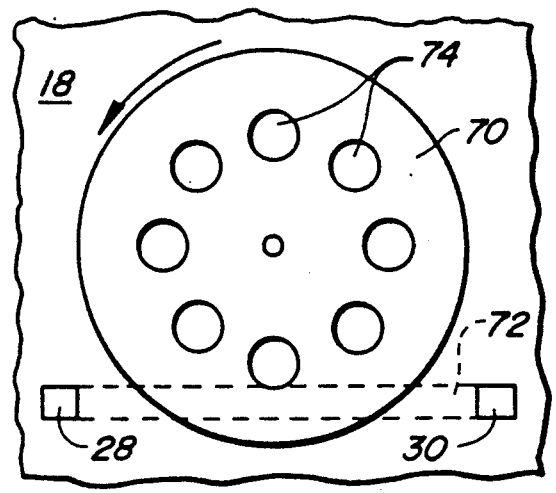
FIG._8D.
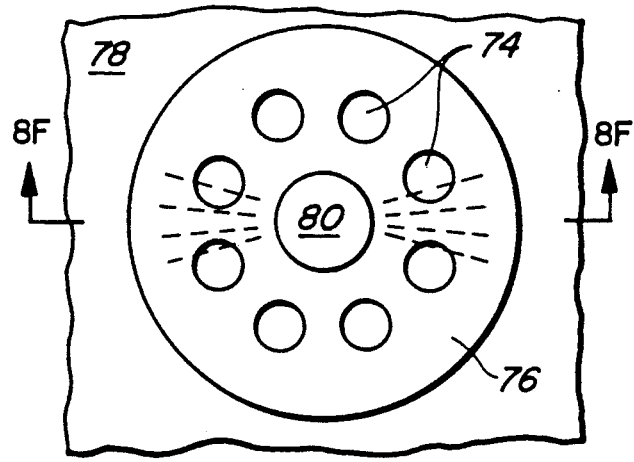
FIG._8E.
FIG._8F.
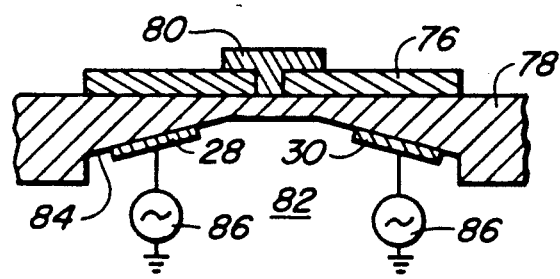
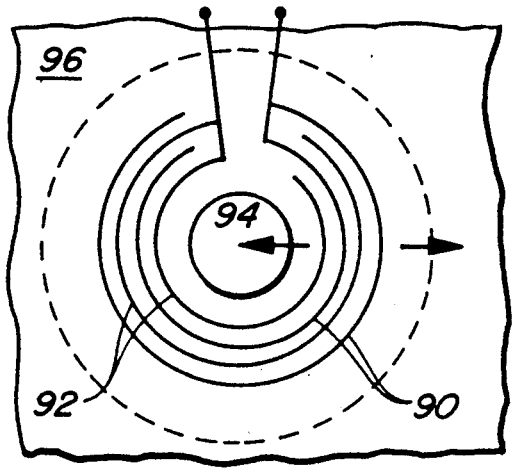
FIG._9.

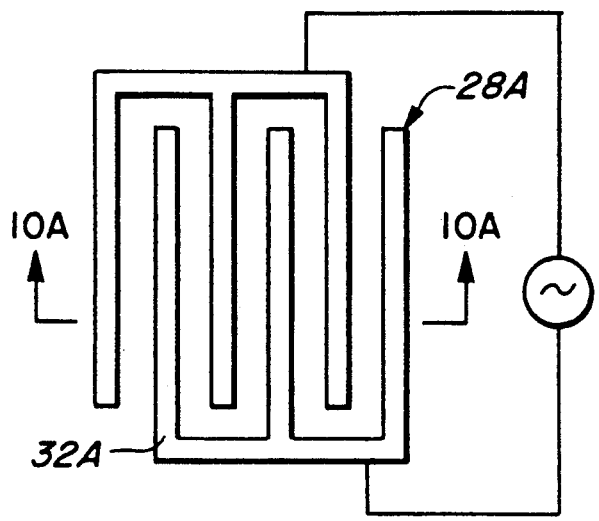
FIG._10.
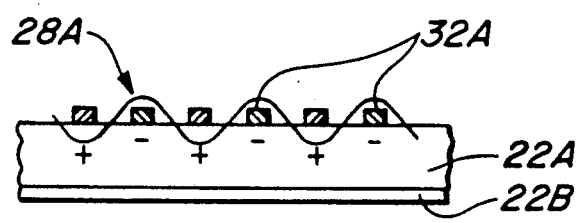
FIG._10A.
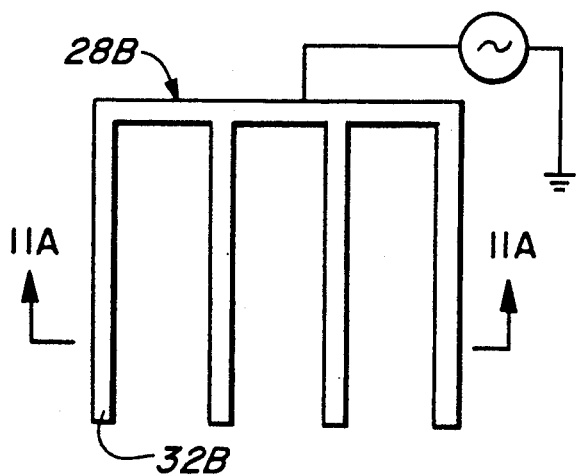
FIG._11.
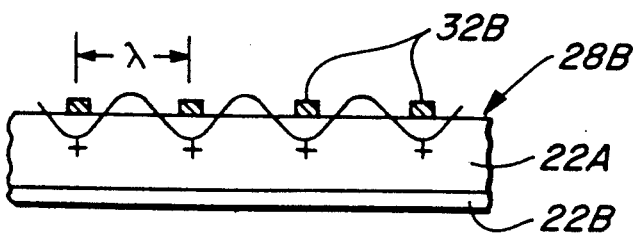
FIG._11A.

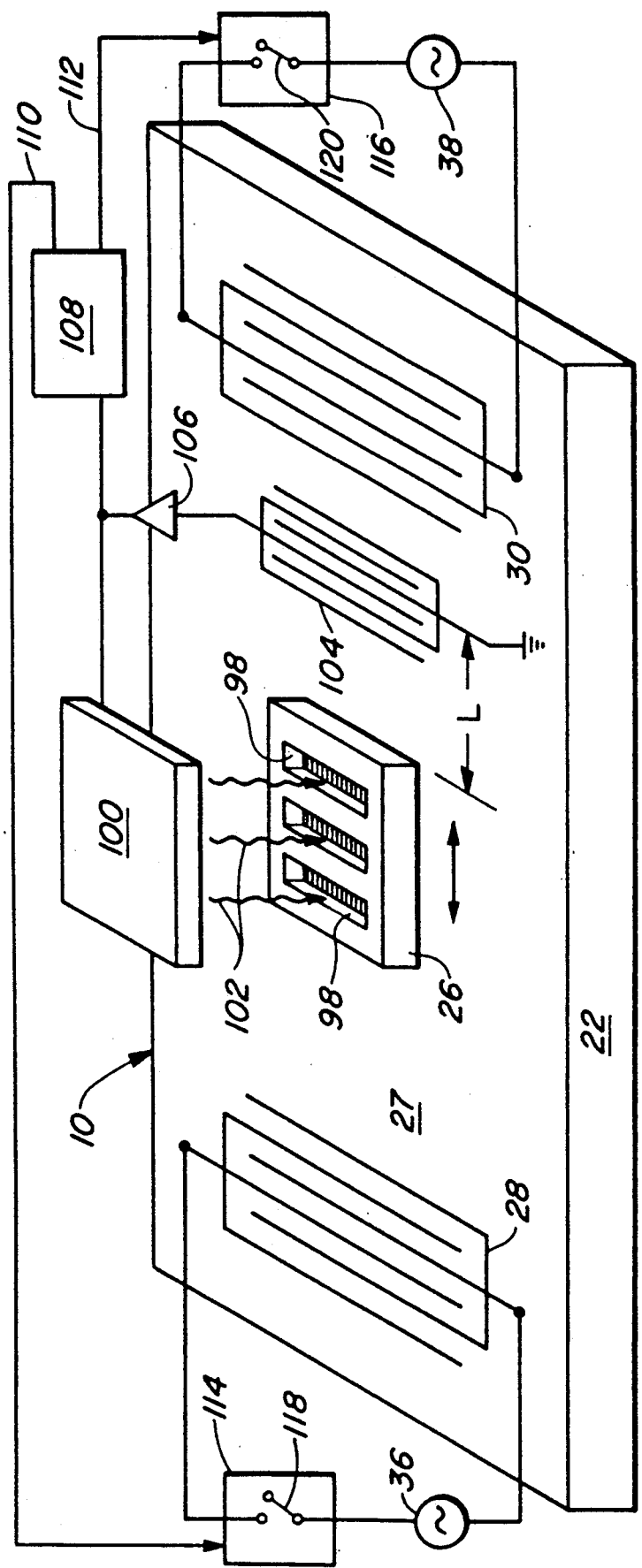
FIG._14.

METHOD AND APPARATUS FOR USING ULTRASONIC ENERGY FOR MOVING MICROMINIATURE ELEMENTS

This invention relates to micromotor devices for moving miniature mechanical parts using ultrasonic waves and also for using ultrasonic vibrations to reduce friction between such parts and their supporting structures.

BACKGROUND OF THE INVENTION

In U.S. Pat. No. 4,740,410 various micro-miniature structures are described such as micro gears, pin joints and sliders, all of which may be movable components forming part of or used in combination with a particular micro-mechanical device. In the aforesaid patent, the structures disclosed are formed in a batch process using integrated circuit type semiconductor fabrication techniques that include deposition and etching steps to form movable elements. Once such micro-miniature structural components have been formed, it then becomes necessary to provide a precisely controllable force or motor to move the elements in the desired manner including timing, speed and direction. One approach to the problem of moving micro-miniature elements is to utilize electrostatic force means to form micro motors. One disadvantage with the latter approach is that electrodes for the micromotor rotor and stator poles and also circuit paths and terminals for the required power must be provided. This tends to complicate the construction of micro-miniature devices for some applications.

A general object of the present invention is to provide a system for moving micro-miniature elements utilizing ultrasonic energy instead of electrostatic force.

From work with macroscopic piezoelectric motors it is known (see Inaba et al., Proc. 1987 IEEE Ultrasonics Symp., pp. 745-756) that a traveling flexural ultrasonic wave can move a mechanical element that is coupled through frictional forces to the wave propagation path. In such a macroscopic motor, the flexural wave is generated with bulk piezoelectric transducers shaped and driven so as to produce a flexural motion, an arrangement that is not compatible with micro-miniature structures made using semiconductor fabrication techniques as previously described.

It is therefore another object of the invention to provide an ultrasonic micromotor for driving movable micro- miniature structural elements that are made using semiconductor fabrication techniques so that both the micromotor and the movable elements are highly compatible components of the same basic structural device.

Another object of the invention is to provide a method using ultrasonic wave energy for moving or driving micro-miniature structural elements in predescribed paths, for predetermined distances and at preselected speeds.

Another object of the invention is to provide a method and a device for using ultrasonic energy to move or drive a micro-miniature element along a surface and also to dither it to reduce friction between the elements and the surface.

Still another object is to provide drive means in which electrical potentials are isolated from the region in which motion occurs, for example, as required for certain medical applications of microscopic movable components.

Another object is to provide a mechanical drive or friction reduction of a movable element that produces minimal electrical interference to nearby circuits.

Another object is to provide means for moving quantities of small objects such as solid powdered chemicals and possibly liquid droplets or streams in a controlled fashion.

Yet another object is to provide drive means that will function properly while in a liquid environment even though the liquid might be electrically conducting.

SUMMARY OF THE INVENTION

In accordance with the principles of the present invention a well is provided on one side of a substrate structure that includes a planar membrane on which ultrasonic plate waves can be generated and propagated. In one typical embodiment, the membrane is surrounded by the well and is comprised of a horizontal upper or top layer of silicon nitride and an adjacent under-layer of piezoelectric zinc oxide. Spaced apart on the underlayer are a pair of transducing drive electrodes which are in the recessed well region below the membrane, thereby providing a featureless smooth surface on the upper side of the silicon nitride layer on which a movable element is supported and can be driven. If desired, the well may be formed in the upper side of the substrate surrounding the movable element. The transducer electrodes are each connected to a source of alternating electrical voltage. When a voltage is supplied to either transducer, a particle motion is generated which produces a flexural wave action in the composite membrane. The particle motion is retrograde elliptical, meaning that for a wave traveling to the right, the particles of the membrane at its point of contact with the driven object will move to the left. The pattern of deformation of the membrane for a wave travelling to the right travels to the right along with the wave. The driven microscopic element will move if the wave amplitude can be made large enough and the movable element can be suitably coupled to the plate or membrane. Various other modifications of the aforesaid ultrasonic device may by utilized within the scope of the invention and are described below.

In a modified form of the invention the required flexural wave action is produced without a piezoelectric layer by electrostriction wherein elastic deformation of a dielectric is induced by an electric field. Here, in the electrostrictive device embodying principles of the invention, the electric field is created within a dielectric layer such as silicon nitride situated between a conductive ground plane and a transducer electrode having two or more conductors that are spaced one wave length apart. Voltage applied to the transducers causes a membrane wave action and thus movement of an object on the ground layer over the membrane in a manner similar to that of a piezoelectric type embodiment.

In another alternative form of the invention, the ultrasonic waves in the membrane plate may be generated by applying a D.C. bias voltage to cause electron or hole drift in a semiconductor located on the same membrane to form an ultrasonic oscillator. Here, the low speed of the wave will permit a relatively small D.C. drift electric field to be used.

The ultrasonic wave action produced in accordance with the invention may be provided in various microminiature structures to produce various motions in different directions, in either linear or circular paths, for one or more movable elements on a membrane plate. Such wave action can also be used to provide a dithering action for reducing the friction of moving micromotor or microscopic elements.

Other objects, advantages and features of the invention will become apparent from the following description of preferred embodiments thereof, presented in conjunction with the accompanying drawing.

BRIEF DESCRIPTION OF THE DRAWING

FIG. 1 is a partially diagrammatic view in elevation and in section of an ultrasonic micromotor for moving an object in one direction according to the present invention.

FIG. 1A is a bottom side plan view of the micromotor shown in FIG. 1.

FIG. 1B is a partially diagrammatic view in elevation and in section showing a modified form of the ultrasonic micromotor of FIG. 1.

FIG. 2A is a partially diagrammatic view in elevation and in section showing yet another modified form of ultrasonic micromotor using patterned ground plane areas according to the invention.

FIG. 2B is a partially diagrammatic view in elevation and in section showing another micromotor embodiment utilizing buried transducers.

FIG. 3 is a partially diagrammatic view in elevation and in section showing an ultrasonic micromotor similar to the one in FIG. 1, but having an external amplifier.

FIG. 4 is a partially diagrammatic view in elevation and in section showing an ultrasonic micromotor employing acoustic amplification in the composite membrane in accordance with the invention.

FIG. 5 is a view in elevation and in section showing a micromotor according to the invention as it appears in combination with a micromechanical pin joint for providing a dithering action.

FIG. 5A is a view in elevation and in section showing a micromotor according to the invention using a simple transducer to vibrate (dither) a pivotal micromechanical member to reduce friction.

FIG. 5B is a plan view of the micromotor dithering arrangement of FIG. 5A.

FIG. 6 is a view in elevation and in section showing a micromotor according to the present invention in combination with a movable slider held loosely in ways.

FIG. 7 is a view in elevation and in section showing a micromotor according to the present invention having electrical means for clamping a movable object to the surface of a supporting membrane.

FIGS. 8A-8D are a series of diagrammatic views showing various ways in which an object can be moved utilizing a micromotor embodying principles of the invention.

FIG. 8E is a diagrammatic plan view of an ultrasonic micromotor according to the invention utilizing a circular membrane of variable thickness.

FIG. 8F is a view in section taken along line 8F—8F of FIG. 8E.

FIG. 9 is a diagrammatic plan view of another way in which radial motion of movable objects may be produced by a micromotor according to the invention.

FIG. 10 is a plan view of a transducer for a piezoelectric micromotor according to the invention.

FIG. 10A is a view in section taken at line 10A—10A of FIG. 10 and showing diagrammatically how wave action in a membrane is produced.

FIG. 11 is a plan view of a transducer for an electrostriction micromotor embodiment according to the invention.

FIG. 11A is a view in section taken along line 11A-11A of FIG. 11 showing diagrammatically how wave action is produced in a non-piezoelectric membrane.

FIG. 12 is a view in elevation and in section showing an electrostrictive type micromotor according to the invention.

FIG. 13 is a view in section of FIG. 12 showing the bottom side of the micromotor.

FIG. 14 is a view in perspective showing a micromotor combined with a position sensor in accordance with principles of the present invention.

DETAILED DESCRIPTION OF EMBODIMENT

With reference to the drawing, FIGS. 1 and 1A show, in partially diagrammatic fashion, a micromotor 10 according to the invention, whose overall length and width dimensions may be as small as 25 microns by 25 microns. Thus, such a micromotor is well adapted for driving micro-miniature mechanical elements such as pivot pins, gears, sliders and other similar movable elements, as shown in U.S Pat. No. 4,740,410, which is assigned to the same assignee as that of the present invention. As described in the aforesaid patent, the movable micro-mechanical elements are made using a method similar to a semiconductor fabrication process. Elements of the micromotor 10 as disclosed are also made using similar techniques, and therefore, micromotors according to the present invention are particularly compatible with and useful for driving such micro elements.

As shown in FIGS. 1 and 1A, the micromotor device 10 is formed within an inverted well 12 of a substrate 14 such as silicon. The substrate may be mounted within a suitable supporting structure 16 such as metal or plastic that surrounds the substrate. A planar membrane 18 extends horizontally across the upper side of the inverted well 12 and forms the element on which ultrasonic plate waves are to be generated and propagated. The membrane is a composite element which may be made of various materials. In the embodiment shown, the membrane 18 is comprised of an upper layer 20 of silicon nitride having a thickness of around two microns and an underlayer 22 of piezoelectric zinc oxide having a thickness of around 0.7 microns. Between the layers 20 and 22, a thin ground layer 23 (e.g. 0.6-0.8 microns) of conductive material such as aluminum may be provided. Other materials for the upper layer 20 and the piezoelectric layer 22 could be used, preferably materials that can be formed using planar semiconductor fabrication techniques.

The upper surface 24 of the silicon nitride layer 20 is smooth, free of obstructions and supports a movable element 26 that can b driven along a preselected path thereon in accordance with the invention. The movable element 26 is shown symbolically as a block, but it can have any desired shape and may be connected in a suitable manner to any other device or element for producing a desired resultant movement. Also, the limits of travel of the element 26 in the surface 24 (indicated by arrows) may be controlled by suitable guides, stops 27, or the like which can be placed at any desired location on the membrane surface. Further, the "shape" of the element 26 may include a contoured bottom surface such as on the block shown, which enables it to "catch" or react to the waves produced in the membrane surface.

Attached to the underside of the composite membrane 18 at spaced apart locations within the inverted well 12 are a pair of transducing electrodes 28 and 30. As shown in FIG. 1A, these electrodes are of the well known type comprised of interdigitated spaced apart fingers 32 of aluminum. For each transducing electrode, the ground layer 23, provided between the piezoelectric zinc oxide layer 22 and the silicon nitride layer 20, increases the strength of piezoelectric coupling of each transducer.

The generation of wave action in a membrane comprised of a layer 22A of crystalline piezoelectric material by a transducer 28A having interdigitated fingers 32A is shown diagrammatically in FIG. 10. As indicated, the interdigitated fingers of the transducer are parallel and evenly spaced apart on top of the layer 22A with a ground plane 23A being provided on its bottom surface. In the interdigitated transducer a first set of fingers 32A are connected at one end to a positive potential and are spaced apart a distance equal to one wave length ($\lambda$). The wavelength is defined as the distance between successive wave crests, or, equivalently, between successive wave troughs. Extending between the first set of fingers is a second set of parallel fingers 32A connected to a negative potential. When the positive potential fingers are activated relative to a zero potential on the ground plane, the positive fingers are attracted to the ground plane and thus tend to constrict the membrane's piezoelectric layer 22A at those locations. The pulsing frequency thus produced by the transducer fingers creates a wave action in the membrane. When the second set of negatively connected fingers are activated, the membrane is temporarily expanded at these finger locations for the transducer, and this further increases the wave action.

The piezoelectric embodiments for the micromotor device 10 of FIG. 1 may be fabricated using more or less conventional semiconductor processing techniques. Thus, for the device 10, a starting component is a silicon wafer on which the layer 20 of silicon nitride is formed by a chemical vapor deposition (CVD) process. Next, the silicon is etched away to form the well 12 and expose the silicon nitride 20. Thereafter, the ground layer 23 of aluminum is sputtered on the silicon nitride and it then may be patterned by etching away portions thereon at selected locations such as the ground layer pads 23A shown under the transducers 28 and 30, as shown in FIG. 2A. Now, the piezoelectric zinc oxide layer 22 is deposited, as by sputtering over the aluminum layer 23 and the silicon nitride 20. Thereafter, the transducers 28 and 30 are formed by first depositing an outer layer of aluminum and then etching it appropriately to form the transducer fingers 32.

In some instances, as shown in FIG. 2B, it may be desireable to bury the transducers 28B and 30B within a well 12B between the silicon nitride layer 20 and the zinc oxide layer 22. Here, a thin ground layer 23B of aluminum is applied over the zinc oxide layer 22 to provide an outer protective coating on the device.

In the embodiments of FIG. 1, 1B, 2A and 2B the transducers 28 and 30 are connected to separate sources 36 and 38 of alternating electrical voltage. When the device 10 of FIG. 1, for example, is activated, each transducer, in combination with the piezoelectric zinc oxide layer 22, produces retrograde elliptical particle motion in one direction in the silicon nitride layer 20 while the wave energy propagates in the other direction. The direction of motion of the element 26 will depend in detail on the element's size, surface features and configuration, and upon the ambient atmosphere, whether it be gaseous or a vacuum. The degree of frictional coupling between object 26 and membrane 18 is also significant in determining the motion of the object. The driven microscopic element will commence moving when the wave amplitude becomes large enough, assuming that the movable element is suitably coupled to the plate, (i.e., upper layer 20). In the embodiment of FIG. 1 the alternating voltage is supplied to transducer 28 for driving the element in one direction or to transducer 30 for driving the element in the other direction in a linear path. If desired, as shown in FIG. 1B, a modified micromotor 10A may be provided with the well 12B of the substrate located on the upper side of the device, surrounding the plane surface 24 of the membrane 18 previously described which supports the movable element 26. Here, the limits of travel for the movable element may be more restricted, but the well also provides additional protection by virtue of the fact that it forms a surrounding silicon barrier 14.

In another alternate form of micromotor 10C, as shown in FIG. 3, self oscillation is utilized to drive the element 26 by connecting the transducers 28 and 30 to a feedback amplifier 42. The positive feedback provided by connecting amplifier 42 can cause self-sustained oscillations to arise so that flexural waves are generated on the membrane 18 and propagate from transducer 30 toward transducer 28. Here, an absorbent material 43, such as polyimide is provided within the well boundaries to prevent reflections of the rightward-propagating waves that transducer 30 also generates and the waves that pass to the left beyond transducer 28. The flexural wave frequency may be selected for different applications and can vary with the design of the transducers and the intended propagation path, in accordance with known principles.

In another micromotor embodiment 10D utilizing the piezoelectric ultrasonic-wave amplifier principle, as shown in FIG. 4, a semiconductor layer 44 is provided on the underside of the membrane 18 between a spaced apart pair of transducers 28 and 30 that are connected by a feedback path 45. As with the previous embodiments, the membrane is comprised of composite layers of silicon nitride 20 and zinc oxide 22. Here, a D.C. bias voltage is applied from a D.C. voltage source 46 to the semiconductor layer 44 to cause electron or hole drift therein and thereby generate waves in the silicon nitride layer 20 of the membrane 18. It is known that where a feedback path exists between transducers, ever-present noise vibrations can be amplified and result in coherent oscillations. The frequency response characteristics of the transducers will determine the frequency of the resulting oscillation. The low speed of the wave will permit a relatively small D.C. electric field to be used. For example, a wave velocity of 265 m/s may be provided on an unloaded membrane and only 97 m/s on a membrane loaded with water on both sides. It is well known that elastic waves traveling in a piezoelectric solid can be amplified by causing electrons or holes to drift in a nearby semiconductor at a velocity that is slightly larger than the wave velocity. Hence, if a low wave velocity is desired, only a relatively small electric field is needed to cause carrier drift and amplification.

The ultrasonic wave sources described herein may also be used to vibrate micromechanical parts to reduce friction in bearings, pin joints, sliders, etc. of the type shown in U.S. Pat. No. 4,740,410. For example, as shown in FIG. 5, a micro-miniature rotatable pin 50 and a bearing element 52 of the type made in accordance with the principles and techniques shown in U.S. Pat. No. 4,740,410 is supported above an ultrasonic device 10E of the type described, having an upper composite membrane 18. The substrate structure provides an inverted well 12 similar to that shown in FIG. 1. Spaced apart on the underside of the membrane, in the same manner as previously described, are a pair of spaced apart transducers 28 and 30, each of which is connected to and controlled by an oscillator. When the transducers are activated to produce ultrasonic energy, flexural wave action is established in the membrane 18 in the manner previously described. This wave action acts upon the bearing element 52 to move it up and down and side to side relative to the associated pin element 50, as indicated by the arrows in a continuous dithering action that reduces the friction between these two relatively movable elements.

In a somewhat modified dithering arrangement, shown in FIGS. 5A and 5B, a pair of relatively movable, micro-miniature pin and bearing elements 50A and 52A are supported directly on a support membrane such as a silicon substrate 16. Here, a transducer 54 of the type shown in FIG. 1, is attached directly to the upper surface of the support membrane 16 and is connected to a controllable oscillator 56. When activated, the transducer produces a vibration that is transmitted directly to the bearing element 52A, again providing a dithering action which greatly reduces static friction between the movable parts.

If the support membrane was made of porous material such as etched silicon or etched silicon nitride, its frictional properties could also be altered in a manner that would depend on the pore dimensions. When a flexural wave is propagated through such a support membrane its passage will cause a motion of gas contained within the pores that could act as a lubricant and so reduce friction between a supported element and the support membrane.

As a further means of providing reduced friction in applications where it is desired to drive movable parts, either the movable element or the supporting membrane may be coated with a material such as polytetraflourethylene, known under the trademark Teflon, or photoresist having a suitable coefficient of friction (e.g., between 0.2 and 0.6). In addition, to ensure maintenance of contact of the movable element 26 against the surface of the membrane 24, several approaches are possible. For example, fluid pressure from a suitable source may be applied against the underside of the membrane for a two-part assembly; or microscopically fabricated springs (not shown), may be utilized against the membrane.

As shown in FIG. 6, the movable element 26 may also be retained for movement within a pair of guide rails 57 which may be attached to a suitable support structure 58 above an ultrasonic device 10. Here, the movable element 26 is constrained to move in a prescribed path and its contact pressure against the membrane 18 is mechanically maintained. Electrostatic attraction of the movable element 26 to the membrane 18 may also be used to maintain the necessary contact pressure as shown in FIG. 7. The electrostatic force may be produced by application of a steady voltage to "clamping" electrodes 60, having alternating potentials and lying under the membrane between the transducers 28 and 30. These electrodes 60 are connected alternately to opposite sides of a D.C. source 62 (e.g. a battery) which is controlled by a switch 64. In order to brake (stop) the moving element 26, the drive transducers 28 and 30 are turned off, and simultaneously the switch 64 is closed so that a voltage is applied to the clamping electrodes 60 causing them to attract object 26 toward them and so to stop the moving element.

The diagrammatic views of FIG. 8A–8F show how one-dimensional, two-dimensional, or rotary motions can be obtained utilizing principles of the invention. A pair of transducer electrodes 28 and 30 (FIG. 8A) will set up straight-crested waves on a composite membrane 18 traveling to the right or left, depending on whether the lefthand or righthand electrodes are driven. If the electrodes were perfectly shaped and aligned, this arrangement would move objects in the path either to the left or to the right depending on which electrodes are driven and on the characteristics of the object being driven. Two-dimensional motion can be achieved with an additional pair of transducers 28A and 30A to create ultrasonic elastic waves in a path lying at right angles to the first (FIG. 8B). Clearly, additional paths can be created; the arrangement of FIG. 8C is analogous to a memory plane having a plurality of transducers 28C and 30C to provide several tracks 66 on which a record/read head, for example, would move horizontally in one direction while positioning over a given track would be caused by suitably energizing the transducers 28 and 30 that produce waves traveling in another horizontal direction indicated by arrow 68.

Rotary motion of a circular object 70 can be produced utilizing principles of the present invention, by ultrasonic waves that contact the object tangentially along a chord 72, as shown in FIG. 8D. Here, the circular object is rotatably mounted on a supporting membrane 18 so that a pair of transducers 28 and 30 on the membrane are spaced apart along a tangential line that intersects an outer portion of one side of the circular object. Flexural wave action in the membrane between the transducers causes the object 70 to rotate to provide a desired function. For example, the object itself may be provided with circumferentially spaced apart openings 74 which serve to chop light as in an optical encoder.

Alternatively, waves traveling on a circular path can be generated with a transducer lying beneath a circular object, as shown in FIGS. 8E and 8F. Here, a circular member 76 is again mounted for rotation on a membrane 78 about a bearing post 80 attached thereto. The circular member may, as previously described, also have a series of circular apertures 74 through which a light beam may be passed and intercepted during rotation to form an optical chopper. As shown in cross-section in FIG. 8F, the membrane comprises a circular recess 82 on its underside which has a sloping inner conical surface 84. Thus, the membrane thickness becomes progressively greater as it extends radially under the circular member 76. A pair of unidirectional transducers 28 and 30 (each connected to an oscillator 86) are attached to the inner conical surface 84 along a diametrical line at an equal radial distance from the center of the membrane recess 82. It is known that the flexural wave velocity is proportional to the thickness of the membrane. Thus, the flexural waves created between the transducers 28 and 30 have a greater velocity at the periphery of the membrane recess and the circular member above it and the waves have crests that lie along radii. These flexural waves will follow any path lying in a plane that has a velocity lower than that of the membrane as a whole. Such a path may be created by thinning any selected region (by etching, for example) of the membrane, thus making it possible to move objects over a defined path that may be other than linear or circular. Thus, in the embodiment of FIGS. 8E and 8F, the ultrasonic wave crests lie along radii, and the wave energy propagates circumferentially, causing the circular member to rotate.

In another arrangement according to the invention, as shown diagrammatically in FIG. 9, radially-propagating plate waves can be generated by transducer electrodes 90 and 92 having circular inter-digitated fingers. Here, these transducers generate radially inwardly propagating cylindrical plate waves which will focus at the center 94 of a membrane 96 similar to membrane 18, as previously described, thereby producing very large amplitudes. This arrangement may be useful for centering objects within a planar region. For example, freely movable particles or elements placed on the membrane could be progressively moved radially inwardly by waves produced by the transducers 90 and 92 toward a central opening, thereby providing either a particular centering or receptacle means.

For a high drive efficiency, an efficient piezoelectric transducer coupling is needed. This coupling efficiency depends upon the strength of piezoelectric coupling of the piezoelectric material used, the plate thickness, and the shapes of the transducer electrodes. Piezoelectric ceramics (such as lead zirconate titanate) have high coupling characteristics, are used in the macroscopic piezoelectric motors, and can be deposited in thin-film form for the microscopic motor described herein. Although thin zinc oxide piezoelectric films can be used, zinc oxide is a much weaker piezoelectric. It has been shown that the coupling obtained with a given piezoelectric film is higher on a thin plate than on a thick substrate, so this factor assists in obtaining good coupling. In addition, a larger number of transducer fingers (e.g., hundreds) may be used to increase efficiency, because a spatially-extended transducer is allowable. The larger number of fingers narrows the transducer frequency bandwidth, but for motor applications this can actually be advantageous. If desired, the wave amplitude may be adjusted by varying frequency slightly. Thus, in different arrangements a number of differently dimensioned devices could be controlled from a single connection to activate the desired transducer by properly selecting the drive frequency. Also, a number of different transducers could be operated without mutual interference if they all were designed for different frequencies of operation.

In order to determine and control the position of the element 26 that is moved by the ultrasonic micromotor 10, the motor elements may be advantageously incorporated to form an ultrasonic position sensor 97 similar to one described in my co-pending patent application Ser. No. 07/399,865, filed Aug. 29, 1989, which is also assigned to the University of California.

The micromotor 10 with an integral position sensor is shown schematically in FIG. 14 and the position sensor elements are basically those shown in of the aforesaid co-pending application. It will be obvious to one skilled in the art that other position sensor embodiments may also be used.

In the arrangement shown in FIG. 14, the movable object, heretofore designated by numeral 26 functions as a movable spatial filter or mask and has a series of parallel, spaced apart slots 98 extending through it. The object rests on the upper surface 27 of a membrane 22 comprised of a piezoelectric substrate between two spaced apart transducers 28 and 30, as previously described. A modulated light source 100 which may be combined with an optical modulator to produce either a steady or a modulated light beam 102, is provided above the movable object 26. The light beam through the slots 98 produces illuminated regions or evenly spaced bands of light on the surface of the membrane. The combination of these light bands with the thermoelastic properties of the substrate 22 results in the generation of ultrasonic plate waves that are converted to electrical form by a transducer 104. The transducer is connected to an amplifier 106 to form an ultrasonic feedback oscillator whose frequency "f" is a measure of the position (L) of the object 26 on the membrane surface relative to the transducer 104. The frequency "f" is measured by a frequency counter 108 which has two outputs 110 and 112. One output is connected to a control circuit 114 for the transducer 28 and the other output 112 is furnished to a similar control circuit 116 for the transducer 30. These control circuits include switches 118 and 120 for controlling power from a source to its connected transducer.

In operation, object 26 is caused to move laterally between transducers 28 and 30 by closing the switches 118 and 120 with the control circuits 114 and 116 to connect radio-frequency voltage sources 36 and 38 to the transducers 28 and 30 respectively. These transducers preferably have dimensions different from those of transducer 104 in the feedback oscillator and sources 36 and 38 will therefore operate at frequencies different from the frequency f around which the position sensor operates. This will prevent interference between the drive and the position-sensing signals.

With additional simple circuitry not shown in the control circuits 114 and 116, a measuring circuit 31 can control the operation of their respective switches 118 and 120 so as to enable the movable object 26 to be moved to any desired location on the membrane surface 27.

Other embodiments of an ultrasonic position sensor which may be incorporated with the ultrasonic micromotor 10 are described in my previously described copending application. Such position sensors may include optical embodiments or if there is an electrical connection to the object 26, a capacitative position-sensing embodiment may be employed.

In an alternate embodiment utilizing an electrostriction phenomenon, a membrane 22B is comprised of a layer of electrically insulating amorphous material such as silicon nitride, a ground layer 23B is provided on a bottom side and a single transducer 28B on its top side comprised of a series of spaced apart parallel conductive fingers 32B, all connected to a positive voltage source. (See FIG. 11). Here again, the center-to-center spacing of the fingers is one wave length ($\lambda$) which is defined, as before, as the distance between successive wave crests or successive wave troughs. As shown diagrammatically in FIG. 11A, when a positive voltage is applied to the fingers, the membrane material 22B is constricted in the areas under the fingers and a wave action is induced within the amorphous membrane material 22B. The electrostriction embodiment has an advantage of being less expensive to manufacture because it does not require crystalline piezoelectric material : the membrane and only one transducer 28B is required to induce a wave action i the membrane. However, an advantage of the piezoelectric type transducer is that it generally produces a larger wave amplitude when driven by a given voltage.

An ultrasonic micromotor device 10 according to the invention but utilizing the electrostriction phenomenon in lieu of the piezoelectric effect utilized in previous embodiments is shown in FIGS. 12 and 13. As illustrated it comprises a nonpiezoelectric support membrane 20 such as silicon nitride which is formed within an inverted well 12 of a substrate 14. The membrane has a thickness in the range of 0.5 to 1 microns and is covered by a conductive material such as aluminum to form an electrical ground plane. A movable element 26 is supported on the smooth upper surface of a ground layer 200. On the underside of the membrane 18 are two unipolar transducers 28 and 30 having parallel fingers 32B and 32C that are evenly spaced apart a distance equal to one wave length of the flexural wave that is to be generated by an alternating voltage source as in the previous embodiments. A layer 43 of absorptive material may be provided at a location outwardly from the transducers 28 and 30 (left and right as viewed in FIG. 12) in order to absorb wave energy that passes beyond either transducer. In order to ensure a smooth transition of waves from either transducer to the middle portion of the membrane 22B, a layer 45 of material having the same mass per unit area as the transducer structures 28 and 30, e.g. aluminum, is deposited between the transducers.

As with the interdigitated transducers used with the piezoelectric embodiments (e.g. FIG. 1), coherent wave generation occurs if the frequency of a generator 36 is adjusted so that the wavelength equals the periodic distance p of the transducer fingers 32B, as shown in FIG. 13. The ground plane 200 may be made more massive (thicker), e.g. 1.0 to 3.0 microns, than the transducer layer on the opposite side of the membrane 18 so as to introduce an asymmetry in the structure and so to enhance the generation of flexural anti-symmetric waves. The voltage generator 36 provides an alternating source of frequency "f", and if it is desired that the frequency of the generated waves should be "f" rather than "2f" which arises with the electrostrictive effect when only an alternating source at frequency "f" is used, one will use a dc voltage source in series with the AC generator 36.

Another advantage of the structures described herein over the macroscopic piezoelectric motor is the higher frequency of operation that can be achieved—megahertz vs. tens of kilohertz. The particle velocity at the point of contact equals the product of angular frequency of operation and particle displacement, so a high frequency favors obtaining a high velocity. Because the ultrasonic wave energy is confined within a region typically much thinner than a wavelength, high energy density and a correspondingly high particle displacement amplitude are attained under the present invention. Note also that the use of multilayer unidirectional transducers, in which interleaved electrodes are driven with suitable (+/-120°) relative phasing may be desirable since they have a higher efficiency than bidirectional transducers. In this embodiment a single transducer may be used for each linear driver; the driven objects would then move back and forth over the plate surface opposite the transducer. The direction of motion will be determined by the relative phasing of the signals that drive the transducer and by the characteristics of the driven object.

Utilizing the principles of the invention, the micromotor 10 and its other embodiments may be utilized for moving micromechanical elements to: position accurately various recording and reading devices used with magnetic mass memories or used with novel memories involving other alterations of ultrasmall structures on a surface (much as is done with the scanning tunneling microscope); drive tiny cutting tools for microsurgery; move elements used for micropositioning; chop coherent or incoherent optical beams by mechanically interrupting them; move powders and small objects from a supply to a region where they are used (e.g., delivery of ink powders in a printing device), and drive fluids for cooling integrated circuits or integrated optical structures.

To those skilled in the art to which this invention relates, many changes in construction or materials and widely differing embodiments and applications of the invention will suggest themselves without departing from the spirit and scope of the invention. The disclosures and the descriptions herein are purely illustrative and are not intended to be in any sense limiting.

What is claimed is:

1. A micromotor device for moving a micro-miniature element along a predetermined path comprising:
   a substrate;
   a membrane supported by said substrate having an upper layer with a planar surface for supporting the element to be moved and a lower layer of a piezoelectric material with a lower surface, said membrane being recessed within a well formed by said substrate;
   ultrasonic generator means attached to one said membrane surface; and
   means for supplying electrical power to said ultrasonic generator means to produce ultrasonic energy and thereby cause a flexural wave action in said membrane.

2. The device as described in claim 1 including control means for varying the amplitude and frequency of the ultrasonic energy produced by said ultrasonic generator means to thereby control the speed and direction of travel of said element.

3. The device as described in claim 1 wherein said membrane has preselected regions which are thinner than the nominal membrane thickness whereby said micro-miniature element can be moved along said thinned regions along a defined path that may be other than linear on circular.

4. The device as described in claim 1 wherein said upper layer is silicon nitride and said lower layer is zinc oxide.

5. The device as described in claim 1 including a ground layer of conductive material between said upper and lower layers.

6. The device as described in claim 1 wherein said membrane is comprised of a first layer of amorphous semiconductor material; a conductive second layer forming a ground plane extending over said first layer and forming said upper planar surface, said ultrasonic generator means comprising a plurality of parallel, finger elements of conductive material attached to said lower membrane surface and connected to said electrical power means.

7. The device as described in claim 6 wherein said finger elements are spaced apart by a distance equal to one wave length of the flexural wave to be utilized.

8. The device as described in claim 6 wherein said first layer of amorphous material is silicon nitride.

9. The device as described in claim 1 wherein said substrate is silicon.

10. The device as described in claim 1 wherein said membrane has a length and a width of around 25 microns.

11. The device as described in claim 4 wherein said silicon nitride layer has a thickness of around 2 microns and said zinc oxide layer has a thickness of around 0.7 microns.

12. The device as described in claim 1 wherein said well is on the underside of said membrane with said ultrasonic generators attached to said lower layer within said well.

13. The device as described in claim 1 wherein said ultrasonic generator means comprise a pair of spaced apart planar transducers, each generator being connected to an oscillation means.

14. The device as described in claim 13 including a plurality of clamping electrodes on the lower surface of said membrane between said spaced apart transducers and connected to a power source; and switch means for controlling power to said electrodes for stopping said micro-miniature element at a selected location on said membrane.

15. The device as described in claim 14 wherein each said planar transducer is comprised of a plurality of interdigitated conductive fingers attached to said upper surface of said membrane.

16. The device as described in claim 14 including a layer of conductive material between said upper and lower layers of said membrane forming a ground plane and patterned generally in the shape of said planar transducers that are vertically aligned therewith.

17. The device as described in claim 14 wherein said planar transducers are buried between said upper and lower layers of said membrane.

18. The device as described in claim 1 wherein said ultrasonic generator means are connected to an amplifier means between them.

19. The device as described in claim 1 including a block of semiconductor material attached to the lower surface of said lower layer between said ultrasonic generator means for amplifying waves produced in said membrane.

20. The device as described in claim 1 including stop means on the upper surface of said membrane for controlling the travel of the element being moved thereon.

21. The device as described in claim 1 including rail guide means above the upper surface of said membrane for controlling the travel of the movable element thereon.

22. A micromotor device for moving a micro-miniature element along a predetermined path comprising:
 a substrate;
 a membrane supported by said substrate having an upper layer with a planar upper surface for supporting the element to be moved and a lower layer of a piezoelectric material with a lower surface;
 ultrasonic generator means attached to one said membrane surface; and
 means for supplying electrical power to said ultrasonic generator means to produce ultrasonic energy and thereby cause a flexural wave action in said membrane;
 wherein said micro-miniature element comprises a disk rotatably attached to said device, said ultrasonic generator means being aligned on said membrane along a line spaced radially from the center of said disk, whereby a flexural wave force is produced to act tangentailly on said disk and cause it to rotate.

23. A micromotor device for moving a micro-miniature element along a predetermined path comprising:
 a substrate;
 a membrane supported by said substrate having an upper layer with a planar upper surface for supporting the element to be moved and a lower layer of a piezoelectric material with a lower surface;
 ultrasonic generator means attached to one said membrane surface; and
 means for supplying electrical power to said ultrasonic generator means to produce ultrasonic energy and thereby cause a flexural wave action in said membrane;
 wherein said membrane has a circular conical recess with a thickness that increases radially from the center of said recess, and a pair of said ultrasonic generator means spaced diametrically apart on the inner surface of said recess and on opposite sides of its center so that a flexural wave action extending radially from said center is produced.

24. A micromotor device for moving a micro-miniature element along a predetermined path comprising:
 a substrate;
 a membrane supported by said substrate having an upper layer with a planar upper surface for supporting the element to be moved and a lower layer of a piezoelectric material with a lower surface;
 ultrasonic generator means attached to one said membrane surface; and
 means for supplying electrical power to said ultrasonic generator means to produce ultrasonic energy and thereby cause a flexural wave action in said membrane;
 wherein said membrane has a central opening and said ultrasonic generator means comprise a pair of arcuate shaped planar transducers spaced radially from opposite sides of said membrane opening and adapted to produce a flexural wave action in said membrane that moves radially towards or away from said opening.

25. A micromotor device for moving a micro-miniature element along a predetermined path comprising:
 a substrate;
 a membrane supported by said substrate having an upper layer with a planar upper surface for supporting the element to be moved and a lower layer of a piezoelectric material with a lower surface;
 ultrasonic generator means attached to one said membrane surface; and
 means for supplying electrical power to said ultrasonic generator means to produce ultrasonic energy and thereby cause a flexural wave action in said membrane;
 wherein said ultrasonic generator means are provided in two pairs of spaced apart planar transducers on one side of said membrane, said transducer pairs being aligned along separate straight lines that intersect at right angles, whereby said micro-miniature element is movable in both "x" and "y" directions which are at right angles to each other on the membrane surface.

26. The device as described in claim 1 wherein said ultrasonic generator means include multiple pairs of spaced apart transducers spaced apart along parallel, spaced apart lines on said membrane.

27. The device as described in claim 1 including a micro-miniature element comprised of two relatively movable components supported on said membrane, said ultrasonic generator means comprising at least one planar transducer attached to said membrane for creating a dithering vibration that reduces friction between said movable components.

28. A micromotor device for controlling the movement of a micro-miniature element along a predetermined path comprising:
a substrate;
a membrane supported by said substrate having an upper planar surface and a bottom surface;
a micro-miniature element having a region of optical transparency forming a second generating transducer means and supported on said upper planar surface;
a first ultrasonic generating transducer means attached to the upper surface of said membrane;
means for supplying electrical power to said first transducer means to produce a flexural wave action in said membrane and thus movement of said micro-miniature element;
a linear position sensor including a fixed receiving transducer on said upper membrane surface, means for illuminating said micro-miniature element and circuit means for generating a position feeedback signal from said second generating transducer means to said fixed receiving transducer; and
means for supplying said feedback signal to said electrical power means to control precisely the position of said micro-miniature element on said upper planar surface.

29. The device as described in claim 28 wherein said linear position sensor comprises:
a modulated light source;
a feedback loop connected to said movable transducer means via a light beam to produce an output frequency;
a frequency counter to measure said output frequency;

30. A method for moving a micro-miniature element along a predetermined path over a surface comprising the steps of:
providing a substrate structure with a multi-layer membrane section having a smooth surface for supporting the element to be moved;
generating ultrasonic plate waves in said membrane section; and
controlling the amplitude and direction of such waves to cause movement of said element along said membrane surface in a desired path.

31. A method for moving a micro-miniature element along a predetermined path over a surface comprising the steps of:
providing a substrate structure with a multi-layer membrane section having a smooth surface for supporting the element to be moved;
generating ultrasonic waves in said membrane section along linear paths that are at right angles to each other;
controlling the amplitude and direction of such waves to cause movement of said element along said membrane surface in a desired path.

32. A method for moving a micro-miniature element along a predetermined path over a surface comprising the steps of:
providing a substrate structure with a multi-layer membrane section having a smooth surface for supporting the element to be moved;
generating ultrasonic waves radially from a central opening in said membrane section to cause movement of said element away from or toward said opening;
controlling the amplitude and direction of such waves to cause movement of said element along said membrane surface in a desired path.

33. A method for moving a micro-miniature element along a predetermined path over a surface comprising the steps of:
providing a substrate structure with a multi-layer membrane section having a smooth surface for supporting the element to be moved;
generating ultrasonic plate waves in said membrane section;
controlling the amplitude and direction of such waves to cause movement of said element along said membrane surface in a desired path;
wherein said micro-miniature element has relatively movable components, and including the step of controlling the frequency of said waves on said membrane section so as to cause a dithering of said movable components to reduce friction as they move relative to each other.

34. A method for moving a micro-miniature element along a predetermined path over a surface comprising the steps of:
providing a substrate structure with a multi-layer membrane section having a smooth surface for supporting the element to be moved;
generating ultrasonic plate waves in said membrane section;
controlling the amplitude and direction of such waves to cause movement of said element along said membrane surface in a desired path;
including the step of providing a membrane with a circular frusto-conical recess with a pair of ultrasonic generators spaced radially from the center of said recess, and causing the speed of waves produced by said generators to increase with distance from said recess center so as to produce waves whose energy propagates in a circumferential direction.

* * * * *